United States Patent
Qi et al.

(10) Patent No.: US 11,248,950 B2
(45) Date of Patent: Feb. 15, 2022

(54) SYSTEM AND METHOD FOR ASSESSING TRANSPORTATION RISK

(71) Applicants: INVENTEC (PUDONG) TECHNOLOGY CORPORATION, Shanghai (CN); INVENTEC CORPORATION, Taipei (TW)

(72) Inventors: De bin Qi, Shanghai (CN); Xiaowei Zhang, Shanghai (CN); Xuefeng Chen, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 246 days.

(21) Appl. No.: 16/573,749

(22) Filed: Sep. 17, 2019

(65) Prior Publication Data
US 2021/0072071 A1    Mar. 11, 2021

(30) Foreign Application Priority Data
Sep. 5, 2019    (CN) .......................... 201910836498.8

(51) Int. Cl.
*G01H 1/00*    (2006.01)
*G06F 17/14*    (2006.01)

(52) U.S. Cl.
CPC ............. *G01H 1/00* (2013.01); *G06F 17/142* (2013.01)

(58) Field of Classification Search
CPC .......... G01H 1/00; G01H 1/06; G06F 17/142; G06F 17/141; G06F 17/14; G06F 17/00; G06Q 10/0635; G06Q 50/30; G01M 17/007; G01M 17/00
See application file for complete search history.

(56) References Cited

U.S. PATENT DOCUMENTS

| | | | |
|---|---|---|---|
| 2012/0204646 A1* | 8/2012 | Lee ......................... | G01M 7/00 73/594 |
| 2015/0254600 A1* | 9/2015 | Murthy ................ | G06Q 10/083 705/337 |
| 2018/0253956 A1* | 9/2018 | Nygren ................ | G08B 21/182 |

* cited by examiner

*Primary Examiner* — Mohamed Charioui
(74) *Attorney, Agent, or Firm* — Maschoff Brennan

(57) ABSTRACT

A method for assessing transportation risk is adapted to an object transported by a vehicle. The method comprises disposing a sensor on a floor of the vehicle to generate and collect a vibration signal, with the floor being configured to carry the object, a computing device performs a time-domain processing procedure according to the vibration signal to output a first data, performs a frequency-domain processing procedure according to the first data to output a second data, performs a risk assessing procedure to output a risk level according to the second data and a reference data, wherein the second data comprises an actual vibration intensity and an actual vibration duration and the reference data comprises a reference vibration intensity and a reference vibration duration.

8 Claims, 5 Drawing Sheets

S30

S42 — Adjusting the actual vibration intensity of the second data by the computing device according to the reference vibration intensity of the reference data S44 — Converting the actual vibration duration of the second data into another vibration duration by the computing device according to the adjusted actual vibration intensity S46 — Comparing the reference vibration duration with the another vibration duration by the computing device to output the risk level

FIG. 5

SYSTEM AND METHOD FOR ASSESSING TRANSPORTATION RISK

CROSS-REFERENCE TO RELATED APPLICATIONS

This non-provisional application claims priority under 35 U.S.C. § 119(a) on Patent Application No(s). 201910836498.8 filed in China on Sep. 5, 2019, the entire contents of which are hereby incorporated by reference.

BACKGROUND

1. Technical Field

This disclosure relates to a system and method for assessing transportation risk.

2. Related Art

In the procedure in which the supplier provides a server to its customer, the assembled cabinet rack will be transported from the location of production to the customer's location. During the transportation of the cabinet rack by a vehicle, the high-speed vehicle generates continuous vibration due to uneven surface of the road. During the transportation, the vibration can't be avoided and continuously exists. Some frequency of the vibration may cause some of the sensitive elements of the product to resonate. Although the stress generated in a single vibration won't cause an immediate damage to the elements, the long-lasting looping stress will cause fatigue damage to the structure of the elements, which further affects the function of the product or damages the product. The intensity of vibration, the time of occurrence and the number of occurrence during transportation can't be predicted and are random. Therefore, it is necessary to use the method of probability and statistic to study the characteristics of signals of the vibration caused during transportation.

In general, collecting the signals of the vibration is based on specific transportation route, the collected data may only represent the average vibration level of the route. The random vibration testing currently used by most companies is referenced to standards set by American Society for Testing and Materials (ASTM) or International Safe Transit Association (ISTA). However, both of these standards are based on specified loading capacity, and the trucks with the specified suspension system are traveling at a specified speed on the expressway as a basic situation for data collection. The actual condition of the cargos is often very different from the specified condition, so the above two standards can't be used to accurately assess the vibration risk under various circumstances in actual transportation.

SUMMARY

According to one or more embodiment of this disclosure, a method for assessing transportation risk, adapted to an object transported by a vehicle, the method comprising: disposing a sensor at a floor of the vehicle, wherein the floor is configured to carry the object; by the sensor, collecting a vibration signal during transportation of the vehicle; by a computing device, executing a time-domain processing procedure according to the vibration frequency to output a first data; by the computing device, executing a frequency-domain processing procedure according to the first data to output a second data; and by the computing device, executing a risk assessing procedure according to the second data and a reference data to output a risk level, wherein the second data includes an actual vibration intensity and an actual vibration duration, the reference data includes a reference vibration intensity and a reference vibration duration.

According to one or more embodiment of this disclosure, a system for assessing transportation risk, adapted to an object transported by a vehicle, the system comprising: a sensor, disposed at a floor of the vehicle, the sensor is configured to collect a vibration signal during the transportation of the vehicle; a storage device, configured to store a reference data, the reference data includes a reference vibration intensity and a reference vibration duration; and a computing device, communication connected to the storage device, the computing device is configured to obtain the vibration signal from the sensor, execute a time-domain processing procedure, a frequency-domain processing procedure and a risk assessing procedure, wherein the time-domain processing procedure is configured to output a first data according to the vibration signal; the frequency-domain processing procedure is configured to output a second data according to the first data, the second data includes an actual vibration intensity and an actual vibration duration; the risk assessing procedure is configured to output a risk level according to the second data and the reference data.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein:

FIG. 5 is a flow chart illustrating a risk assessing procedure according to another embodiment of the present invention.

DETAILED DESCRIPTION

Figure 1:
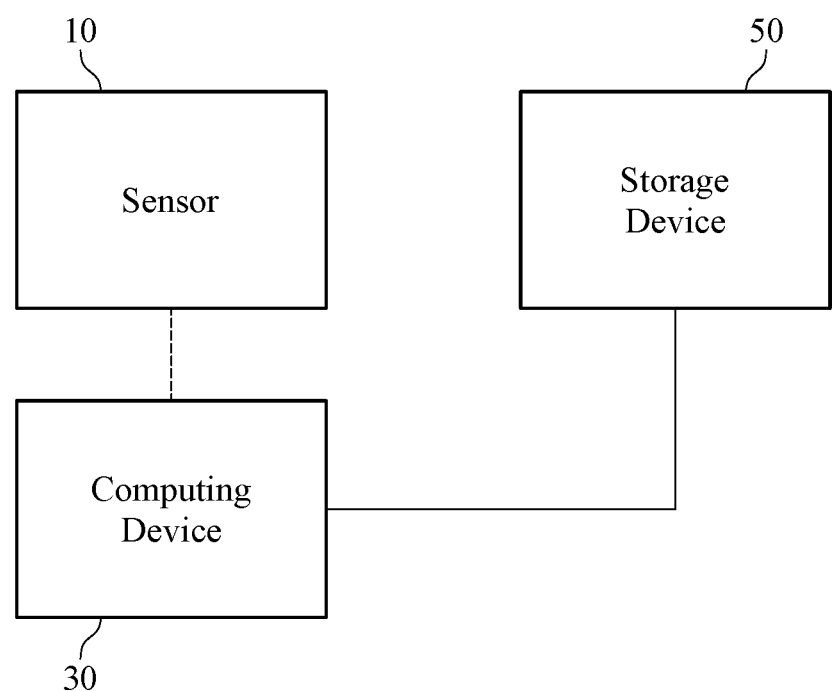
FIG. 1 is a block diagram illustrating a system for assessing transportation risk according to one embodiment of the present invention.

Please refer to FIG. 1 which is a block diagram illustrating a system for assessing transportation risk of one embodiment of the present invention. As shown in FIG. 1, the described system includes a sensor 10, a computing device 30 and a storage device 50.

The sensor 10 senses to generate sensed data. The computing device 30 is configured to obtain the sensed data from the sensor 10. For example, the method of the obtaining the sensed data of the sensor 10 by the computing device 30 can be: by electrically connecting the sensor 10 to the computing device 30 to transmit the sensed data, by electrically connecting the memory disk of the sensor 10, which is used to store the sensed data, to the computing device 30 to transmit the sensed data, or by downloading the sensed data through internet, which is uploaded to a cloud by the sensor 10, by the computing device 30. The present invention does not limit the methods of obtaining the sensed data by the computing device 30 from the sensor 10. The storage device 50 stores a reference data, the storage device 50 is communication connected to the computing device 30 to transmit the reference data.

Figure 2:
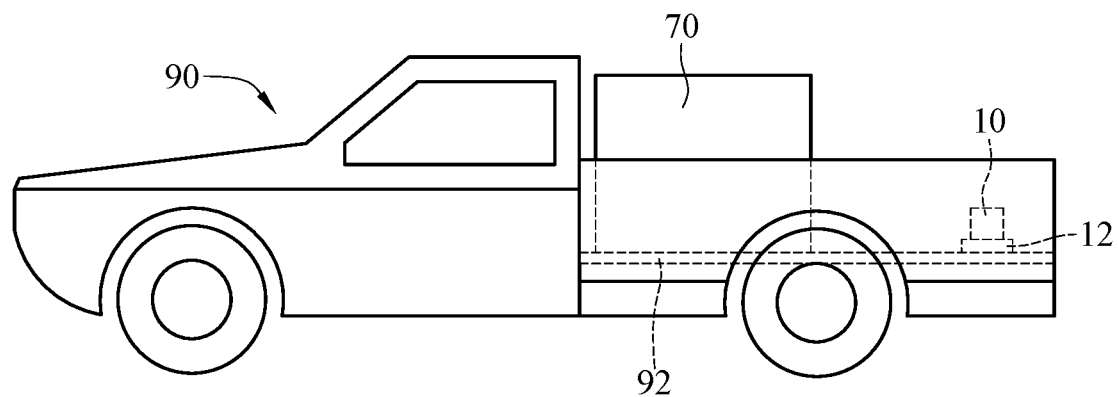
FIG. 2 is a schematic diagram illustrating the configuration of a sensor collecting data.

Please refer to FIG. 2, which is a schematic diagram illustrating the configuration of the sensor 10 collecting data. The system for assessing transportation risk of one embodiment of the present invention is adapted to assess a risk level of an actual transportation of an object 70 by a vehicle 90. The object 70 is, for example, a cabinet rack, a server, or a cargo which is easily affected by vibration. The vehicle 90 has a floor 92 which is configured to carry the object 70.

Figure 3:
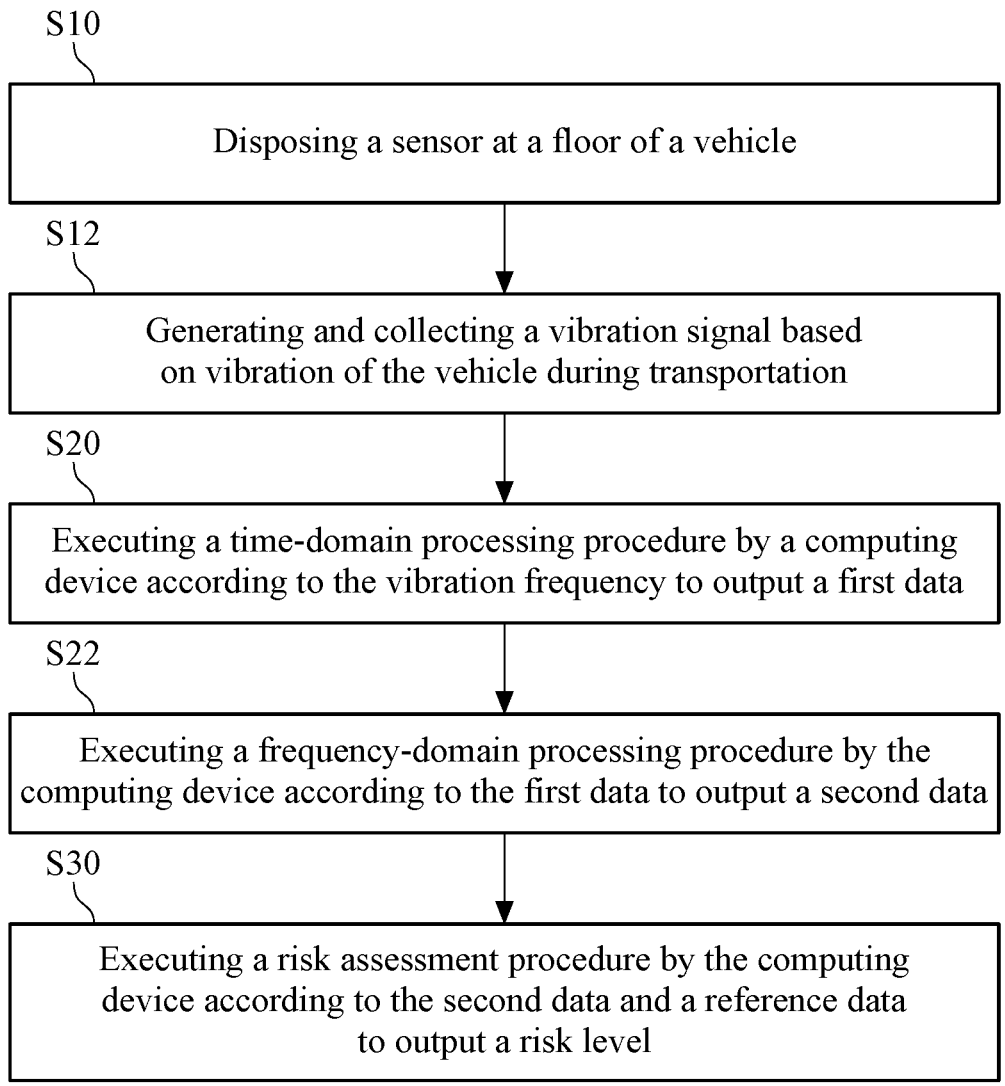
FIG. 3 is a flow chart illustrating a method for assessing transportation risk according to one embodiment of the present invention.

Please refer to FIG. 3, which is a flow chart illustrating a method for assessing transportation risk of one embodiment of the present invention. The system for assessing the transportation risk of one embodiment of the present invention operates according to the flow chart illustrated in FIG. 3.

Please refer to FIG. 2 and step 10 of FIG. 3, disposing the sensor 10 at the floor 92 of the vehicle 90. The sensor 10 is configured to collect the vibration signal of the vehicle 90 during transportation. The sensor 10 has a triaxial accelerator and a built-in power source which can record an acceleration signal during transportation. The sensor 10, for example, is the SAVER 3X90 field data recorder manufactured by Lansmont Corporation, US. In practice, the sensor 10 can be adsorbed to a base board of a compartment of the vehicle 90 using a base 12 having a strong magnet, as shown in FIG. 2. But the disposing location of the sensor 10 is not limited thereto. It should also be noted that the sensor 10, the base 12, the object 70, the vehicle 90 and its floor 92 illustrated in FIG. 2 are not drawn to scale, but are merely illustration of the relative positions of these components.

Please refer to step S12, by the sensor 10, collecting the vibration signal of the vehicle 90 during transportation. In detail, the sensor 10 is activated to collect data when the transportation starts, the sensor 10 is turned off when the cargo arrives, and the sensor 10 then outputs the vibration signal collected during the sensing to the computing device 30 (equivalent to the computing device 30 obtaining the vibration signal from the sensor 10). The vibration signal, for example, is a triaxial acceleration signal. The computing device 30 can execute a time-domain processing procedure, a frequency-domain processing procedure and a risk assessing procedure according to the vibration signal. Wherein, the time-domain processing procedure is outputting a first signal according to the vibration signal, corresponding to step S20 in FIG. 3; the frequency-domain processing procedure is outputting a second data according to the first data, corresponding to step S22 in FIG. 3; the risk assessing procedure is outputting a risk level according to the second data and a reference data, corresponding to step 30 in FIG. 3.

Please refer to step S20, the computing device 30 executes the time-domain processing procedure according to the vibration signal to output the first data. In particular, the computing device 30 eliminates the noise part of the vibration signal. In practice, due to voltage or environmental factors, the vibration signal appears to gradually drift upward. Therefore, the computing device 30 eliminates a linear-trend term and a quadratic-trend term of the original signal to output the vibration signal that exhibits a horizontal trend, which is referred to herein as a third data. Then, the computing device 30 calculates a mean value of the third data and determines whether the mean value reaches a mean threshold value. If it is determined that the mean value reaches the mean threshold value, then eliminates the mean threshold value from the third data and use the third data after the elimination as a fourth data; if it is determined that the mean value does not reach the mean threshold value, then use the third data as the fourth data. Next, the computing device 30 according to a peak threshold value (for example, 0.1 g) filters out a parking data from the fourth data and uses the filtered fourth data as a fifth data. The parking data is a data sensed when the vehicle 90 stops during transportation, and since the data are not helpful in assessing the transportation risk, they need to be filtered out. The computing device 30 then executes a low pass filtering procedure according to a cutoff frequency and the fifth data to output the first data, so as to correspond a frequency sampling range (for example, is 0-200 Hz) of the first data to the frequency sampling range of the reference data.

Please refer to step S22, the computing device 30 executes the frequency-domain processing procedure on the first data to output the second data. In particular, the computing device 30 extracts a plurality of frequency points and vibration amplitudes at each frequency point from the first data. In practice, the computing device 30 executes a fast Fourier transform (FFT) according to the first data that's been through the time-domain processing procedure and a plurality of predetermined parameters to output the second data. The second data includes an actual vibration intensity and an actual vibration duration. The described predetermined parameters include a FFT parameter, a sampling frequency and a maximum analyzing frequency etc.

Please refer to step S30, the computing device 30 executes the risk assessing procedure to output a risk level according to the second data and the reference data. The second data includes the actual vibration intensity and the actual vibration duration, the reference data includes a reference vibration intensity and a reference vibration duration. In detail, a reference data generated after the laboratory performs the vibration test is stored in the storage device 50 as the reference data. Compared to the actual transportation, the vibration test that's performed by the laboratory uses a greater vibration intensity and a relatively short testing duration. The present invention conducts computation based on the Palmgren-Miner rule, to establish a correlation between the vibration intensity and the vibration duration:

$$\frac{t_t}{t_a} = \left(\frac{a_a}{a_t}\right)^k, \qquad \text{(Equation 1)}$$

wherein "$t_t$" represents the reference vibration duration, "$a_t$" represents the root mean square value of the reference vibration intensity (Grms), "$a_a$" represents the root mean square value of the actual vibration intensity (Grms), "$t_a$" represents the actual vibration duration, "k" is generally "2."

Figure 4:
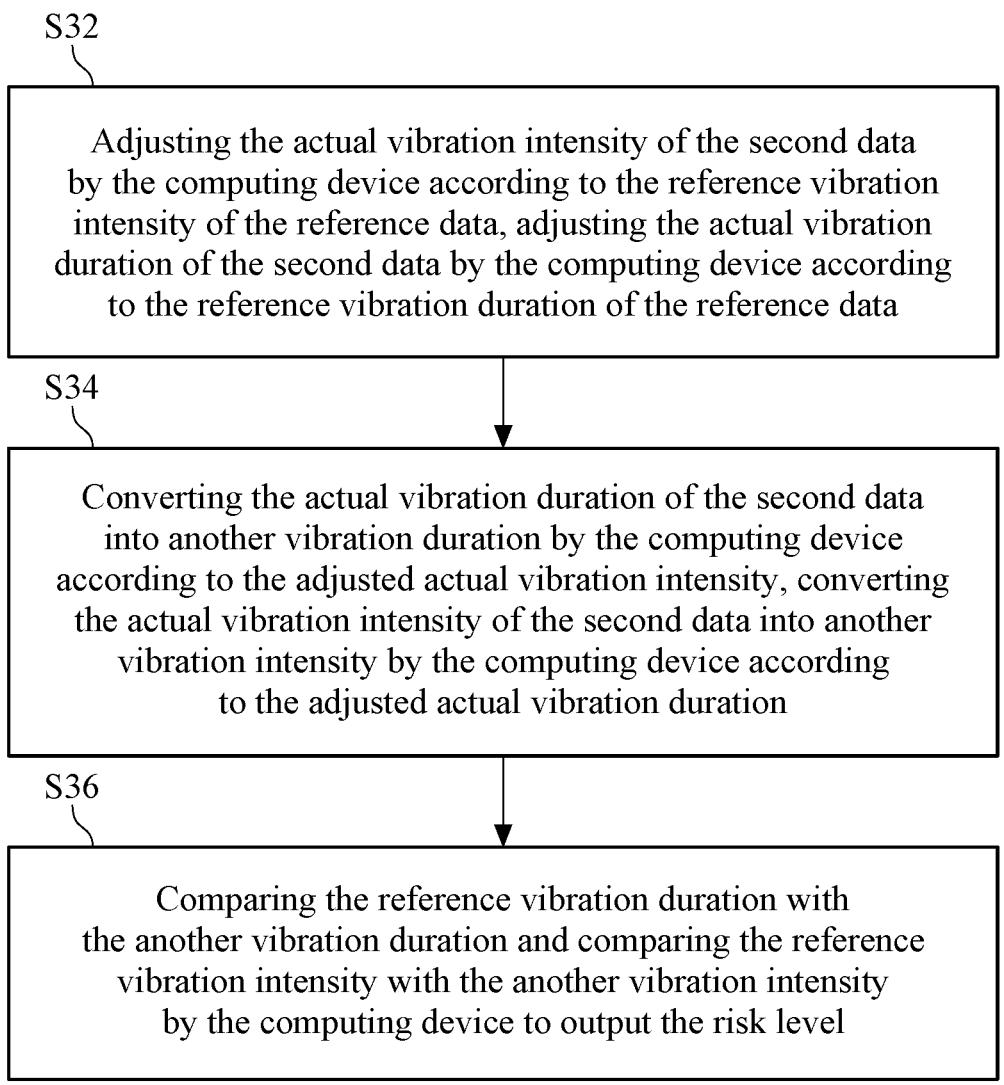
FIG. 4 is a flow chart illustrating a risk assessing procedure according to one embodiment of the present invention.

Please refer to FIG. 4, which is a flow chart illustrating a risk assessing procedure of one embodiment of the present invention.

Please refer to step S32, the computing device 30 adjusts the actual vibration intensity of the second data according to the reference vibration intensity of the reference data, and adjusts the actual vibration duration of the second data according to the reference vibration duration of the reference data.

Please refer to step S34, the computing device 30 converts the actual vibration duration of the second data into another vibration duration according to the adjusted actual vibration intensity, and converts the actual vibration intensity of the second data into another vibration intensity according to the adjusted actual vibration duration.

Please refer to step S36, the computing device 30 compares the reference vibration duration with the another vibration duration, and compares the reference vibration intensity with the another vibration intensity to output the risk level.

Regarding the risk level determination in step S36, in detail, if the comparison of the vibration intensity and the vibration duration are considered at the same time, then there are the following four conditions:

condition 1: the reference vibration intensity is greater than the another vibration intensity, and the reference vibration duration is greater than the another vibration duration;

condition 2: the reference vibration intensity is greater than the another vibration intensity, and the reference vibration duration is less than or equal to the another vibration duration;

condition 3: the reference vibration intensity is smaller than or equal to the another vibration intensity, and the reference vibration duration is greater than or equal to the another vibration duration;

condition 4: the reference vibration intensity is smaller than or equal to the another vibration intensity, and the reference vibration duration is smaller than or equal to the another vibration duration.

If the computing device 30 obtains condition 1 after the comparison, then it is able to determine that the risk level is "low". If the computing device 30 obtains condition 4 after the comparison, then it is able to determine that the risk level is high. If the computing device 30 obtains condition 2 or 3 after the comparison, the vibration duration or the vibration intensity can be focusedly considered or either one of them are not focusedly considered selectively according to the actual condition. For example, if the vibration duration is focusedly considered, then the computing device 30 determines the risk level is "medium high" for condition 2, and the computing device 30 determines the risk level is "medium low" for condition 3. If the vibration intensity is focusedly considered, then the computing device 30 determines the risk level is "medium low" for condition 2, and the computing device 30 determines the risk level is "medium high" for condition 3. If either one of them is focusedly considered, then the computing device 30 determines the risk level is "medium" for both condition 2 and condition 3.

Please refer to FIG. 5, which is a flow chart illustrating a risk assessing procedure of another embodiment of the present invention, the risk assessing procedure of this embodiment is equivalent to a simplified version of the risk assessing procedure of the previous embodiment.

Please refer to step S42, the computing device 30 adjusts the actual vibration intensity of the second data according to the reference vibration intensity of the reference data. For example, it is assumed that the reference vibration duration "$t_r$" of the reference data is 2 hours, the reference vibration intensity "$a_r$" of the reference data is 1.146 g; and it is assumed that the actual vibration intensity "$a_a$" of the second data is 0.239 g, the actual vibration duration "$t_a$" is 24 hours. In step S42, adjusting the actual vibration intensity "$a_a$" of the second data according to the reference vibration intensity "$a_r$", in which the value of the actual vibration intensity "$a_a$" needs to be magnified around $\sqrt{23}$ times.

Please refer to step S44, the computing device 30 converts the actual vibration duration of the second data into another vibration duration according to the adjusted vibration intensity. According to the foregoing example, the computing device 30 can substitute the above value into equation 1 and obtain another vibration duration, which is 1.04 hours.

Please refer to step S46, the computing device 30 compares the reference vibration duration with the another vibration duration to output a risk level. The risk level can be divided, for example, into "high" and "low" levels. According to the foregoing example, since 2 hours is greater than 1.04 hours, it can be determined that the reference vibration intensity in the laboratory is greater than the actual vibration intensity during actual transportation, hence the risk level is determined as "low". On the contrary, the risk level is determined as "high".

It should be noted that, the risk assessing procedure in FIG. 5 is merely a simplified embodiment of the risk assessing procedure in FIG. 4. A person skilled in the art to which the present invention pertains can obtain another embodiment (the computing device 30 compares the reference vibration intensity with another vibration intensity to output the risk level) according to FIG. 4 and FIG. 5, and the description thereof will not be repeated.

In view of the above description, the method and system for assessing transportation risk disclosed in the present invention, by comparing the vibration data collected during actual transportation with the vibration data tested in the laboratory, the risk level during actual transportation may be accurately assessed. The result of the assessment may be applied for the designs of the packaging of the cabinet rack to mitigate vibration, to ensure the quality of the product after it is transported to the destination.

What is claimed is:

1. A method for assessing transportation risk, adapted to an object transported by a vehicle, the method comprising:
   disposing a sensor at a floor of the vehicle, wherein the floor is configured to carry the object;
   by the sensor, collecting and generating a vibration signal based on vibration of the vehicle during transportation;
   by a computing device, executing a time-domain processing procedure according to a vibration frequency to output a first data;
   by the computing device, executing a frequency-domain processing procedure according to the first data to output a second data; and
   by the computing device, executing a risk assessing procedure according to the second data and a reference data to output a risk level, wherein
   the second data includes an actual vibration intensity and an actual vibration duration, the reference data includes a reference vibration intensity and a reference vibration duration,
   wherein the frequency-domain processing procedure comprising: by the computing device, executing a fast Fourier transform according to the first data, a fast Fourier transform parameter, a sampling frequency and a maximum analyzing frequency to output the second data.

2. The method for assessing transportation risk according to claim 1, wherein by the computing device, executing the risk assessing procedure according to the second data and the reference data further comprising:
   by the computing device, adjusting the actual vibration intensity of the second data according to the reference vibration intensity of the reference data to obtain an adjusted actual vibration intensity;
   by the computing device, adjusting the actual vibration duration of the second data according to the reference vibration duration of the reference data to obtain an adjusted actual vibration duration;

by the computing device, converting the actual vibration duration of the second data into another vibration duration according to the adjusted actual vibration intensity;

by the computing device, converting the actual vibration intensity of the second data into another vibration intensity according to the adjusted actual vibration duration; and by the computing device, comparing the reference vibration duration with the another vibration duration and comparing the reference vibration intensity with the another vibration intensity to output the risk level.

3. The method for assessing transportation risk according to claim 1, wherein the vibration signal is a triaxial acceleration signal.

4. The method for assessing transportation risk according to claim 1, wherein the time-domain processing procedure comprising:

by the computing device, eliminating a linear-trend term and a quadratic-trend term according to the vibration signal to output a third data;

by the computing device, executing a mean value eliminating procedure according to a mean threshold value and the third data to output a fourth data;

by the computing device, executing a parking data filtering procedure according to a peak threshold value and the fourth data to output a fifth data; and by the computing device, executing a low pass filtering procedure according to a cutoff frequency and the fifth data to output the first data.

5. A system for assessing transportation risk, adapted to an object transported by a vehicle, the system comprising:

a sensor, disposed at a floor of the vehicle, the sensor is configured to collect a vibration signal during the transportation of the vehicle;

a storage device, configured to store a reference data, the reference data includes a reference vibration intensity and a reference vibration duration; and a computing device, communication connected to the storage device, the computing device is configured to obtain the vibration signal from the sensor, execute a time-domain processing procedure, a frequency-domain processing procedure and a risk assessing procedure, wherein the time-domain processing procedure is configured to output a first data according to the vibration signal;

the frequency-domain processing procedure is configured to output a second data according to the first data, the second data includes an actual vibration intensity and an actual vibration duration, wherein the frequency-domain processing procedure is the computing device executes a fast Fourier transform according to the first data, a fast Fourier transform parameter, a sampling frequency and a maximum analyzing frequency to output the second data;

the risk assessing procedure is configured to output a risk level according to the second data and the reference data.

6. The system for assessing transportation risk according to claim 5, wherein the risk assessing procedure is:

the computing device converts the actual vibration duration of the second data into another vibration duration according the reference vibration intensity of the reference data and the actual vibration intensity of the second data;

the computing device converts the actual vibration intensity of the second data into another vibration intensity according to the reference vibration duration of the reference data and the actual vibration duration of the second data; and the computing device compares the reference vibration duration with the another vibration duration, and compares the reference vibration intensity with the another vibration intensity to output the risk level.

7. The system for assessing transportation risk according to claim 5, wherein the vibration signal is a triaxial acceleration signal.

8. The system for assessing transportation risk according to claim 5, wherein the time-domain processing procedure is the computing device eliminates a linear-trend term and a quadratic-trend term according to the vibration signal to output a third data, executes a mean value eliminating procedure according to a mean threshold value and the third data to output a fourth data, executes a parking data filtering procedure according to a peak threshold value and the fourth data to output a fifth data, and executes a low pass filtering procedure according to a cutoff frequency and the fifth data to output the first data.

* * * * *